United States Patent
Park et al.

(10) Patent No.: US 8,764,427 B2
(45) Date of Patent: *Jul. 1, 2014

(54) APPARATUS FOR FORMING PATTERN USING LASER

(75) Inventors: Deukil Park, Pyeongtaek-si (KR);
Choongyop Rhew, Pyeongtaek-si (KR);
Daisoung Park, Pyeongtaek-si (KR);
Wonmyeong Kang, Pyeongtaek-si (KR)

(73) Assignee: HB Technology Co., Ltd., Choongcheongnam-Do (KR)

( * ) Notice: Subject to any disclaimer, the term of this patent is extended or adjusted under 35 U.S.C. 154(b) by 479 days.

This patent is subject to a terminal disclaimer.

(21) Appl. No.: 12/834,203

(22) Filed: Jul. 12, 2010

(65) Prior Publication Data

US 2011/0008481 A1    Jan. 13, 2011

(30) Foreign Application Priority Data

Jul. 10, 2009   (KR) .................... 10-2009-0062801

(51) Int. Cl.
  *B29C 59/16* (2006.01)

(52) U.S. Cl.
  USPC ........ 425/174.4; 425/174; 425/304; 425/385; 264/1.24; 264/1.33; 264/1.37; 264/2.7; 264/400; 264/482

(58) Field of Classification Search
  USPC .............. 425/174, 174.4, 304, 385; 264/1.37, 264/400, 482, 1.24, 1.33, 2.7
  See application file for complete search history.

(56) References Cited

U.S. PATENT DOCUMENTS

2002/0024904 A1*  2/2002  Kobayashi et al. .......... 369/52.1

OTHER PUBLICATIONS

KIPO English machine translation for KR 10-2002-0064227, retreived Sep. 24, 2012.*
KIPO English machine translation for KR 10-2007-0115399, retreived Sep. 24, 2012.*
KIPO English machine translation of KR 10-2002-0064227, retreived Apr. 23, 2013.*

* cited by examiner

*Primary Examiner* — Timothy Kennedy
(74) *Attorney, Agent, or Firm* — IPLA P.A.; James E. Bame

(57) ABSTRACT

An apparatus for forming a pattern using a laser is provided. The apparatus includes a pattern storing unit, a controller, a laser oscillating unit, an X-Y driver, a header unit, and a stage. The pattern storing unit stores data on light guide patterns of a discontinuous straight line shape. The controller transmits position signal of the light guide patterns to the X-Y driver and simultaneously, transmits a switching signal to the laser oscillating unit. The laser oscillating unit outputs a laser beam synchronized with a movement of the header unit. The X-Y driver moves the header unit and the stage. The header unit moves along a first guide rail. The stage moves along a fixed second guide rail in the front and rear direction of the light guide panel.

5 Claims, 3 Drawing Sheets

APPARATUS FOR FORMING PATTERN USING LASER

CROSS REFERENCE

This application claims foreign priority under Paris Convention and 35 U.S.C. §119 to Korean Patent Application No. 10-2009-0062801, filed Jul. 10, 2009 with the Korean Intellectual Property Office.

BACKGROUND OF THE INVENTION

1. Technical Field

The present invention relates to manufacturing a pattern of a light guide panel of a surface light source device used in a liquid crystal display device, a lighting signboard, a cellular phone, a telephone, a Personal Digital Assistant (PDA), a keyboard, an electronic calculator, etc. More particularly, the present invention relates to an apparatus for forming a pattern using a laser, for controlling a luminance characteristic of a light guide panel resulting from an output characteristic of a laser beam, by differentially controlling lengths of light guide patterns and forming the light guide patterns in a plurality of light guide panels.

2. Description of the Related Art

Commonly, a light guide panel, which is a plate for providing a path for uniformly scattering and diffusing light scanned from a light source, is being applied to a light receiving flat display device such as a liquid crystal display device, or a surface light source device used in a lighting signboard, etc.

FIG. 1 is a cross section schematically illustrating a conventional surface light source device.

Referring to FIG. 1, the conventional surface light source device 10 includes a light guide panel 11, a reflective sheet 12 installed below the light guide panel 11, a light source 13 installed at one side of the light guide panel 11, and a cover member 14 covering the light source 13. As the light source 13, a cold cathode fluorescent lamp, a Light Emitting Diode (LED), etc. can be used. In the light guide panel 11, a plurality of light guide patterns 15 are formed by using a bead-shaped Oxide Titanium ($TiO_2$) and ink including glass, acryl, etc. to scatter and diffuse light incident on one surface of a transparent acrylic resin. In the surface light source device 10, light irradiated from the light source 13 is incident on the light guide panel 11, and the incident light is guided through the light guide panel 11 as indicated by arrows. After that, the guided light is reflected at relatively uniform illumination in each part by the reflective sheet 12 and the light guide patterns 15. After that, the reflected light passes through a diffuse sheet 16 and again passes through a prism sheet 17 to direct toward the front.

On the other hand, as a method for forming the light guide patterns 15 of the light guide panel 11, there is a method using a Carbon Dioxide ($CO_2$) laser. However, in the Carbon Dioxide ($CO_2$) laser, output characteristic is lowered according to distance. Thus, in case that a plurality of light guide panels 11 are simultaneously manufactured on the basis of the same length information of light guide patterns 15, there is a problem of making a luminance characteristic of each of the light guide panels 11 non-uniform.

Also, position and length information on each light guide pattern 15 to be formed in the light guide panel 11 are generally previously stored in a pattern storing module (not shown), and this information is read out from the pattern storing module (not shown) to form the light guide patterns 15. In this case, there is a problem of the occurrence of an exterior warp phenomenon in which it is seen that the light guide patterns 15 formed in the light guide panel 11 are seemingly curved or warped along their edges due to several main causes.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide an apparatus for forming a pattern using a laser, for controlling a luminance characteristic of a light guide panel resulting from an output characteristic of a laser beam.

Another aspect of exemplary embodiments of the present invention is to provide an apparatus for forming a pattern using a laser, for improving the productivity of light guide patterns.

A further aspect of exemplary embodiments of the present invention is to provide an apparatus for forming a pattern using a laser, for eliminating an exterior warp phenomenon occurring in light guide patterns.

According to one aspect of the present invention, an apparatus for forming a pattern using a laser is provided. The apparatus includes a pattern storing unit, a controller, a laser oscillating unit, an X-Y driver, a header unit, and a stage. The pattern storing unit stores data on light guide patterns of a discontinuous straight line shape to be formed in a light guide panel. The controller reads out position signals of the light guide patterns to be formed in the light guide panel from the pattern storing unit and transmits the read-out position signal to the X-Y driver and simultaneously, transmits a switching signal, which is generated on the basis of length information of the light guide patterns, to the laser oscillating unit. The laser oscillating unit outputs a laser beam synchronized with a movement of the header unit, on the basis of the switching signal received from the controller. The X-Y driver moves the header unit and the stage on the basis of the position signal received from the controller. The header unit moves along a first guide rail in the left and right direction of the light guide panel by way of the X-Y driver, and forms the light guide patterns in the light guide panel by vertically downwardly reflecting and concentrating the laser beam output from the laser oscillating unit. The stage moves along a fixed second guide rail in the front and rear direction of the light guide panel by way of the X-Y driver, and fixes a plurality of light guide panels. By differentially controlling lengths of the light guide patterns formed in each of the plurality of light guide panels, the controller controls a luminance characteristic of the light guide panel resulting from a distance-dependent output characteristic of the laser beam.

The stage is a stage capable of fixing a plurality of light guide panels.

By differentially controlling lengths of the light guide patterns formed in a left light guide panel and lengths of the light guide patterns formed in a right light guide panel, the controller controls the luminance characteristic of the light guide panel resulting from the distance-dependent output characteristic of the laser beam.

The controller varies a starting point of formation of the light guide pattern, by adding an arbitrary random value of 5 μm to 100 μm to an X coordinate of the position signal read out from the pattern storing unit, for each of the light guide patterns to be formed in the light guide panel.

The controller varies a length of the light guide pattern, by adding an arbitrary random value of 5 μm to 100 μm to the length information read out from the pattern storing unit, for each of the light guide patterns to be formed in the light guide panel.

BRIEF DESCRIPTION OF THE DRAWINGS

The above and other objects, features and advantages of the present invention will become more apparent from the following detailed description when taken in conjunction with the accompanying drawings in which.

Throughout the drawings, the same drawing reference numerals will be understood to refer to the same elements, features and structures.

DESCRIPTION OF SPECIFIC EMBODIMENTS

Exemplary embodiments of the present invention will now be described in detail with reference to the annexed drawings. In the following description, a detailed description of known functions and configurations incorporated herein has been omitted for conciseness.

Figure 1:
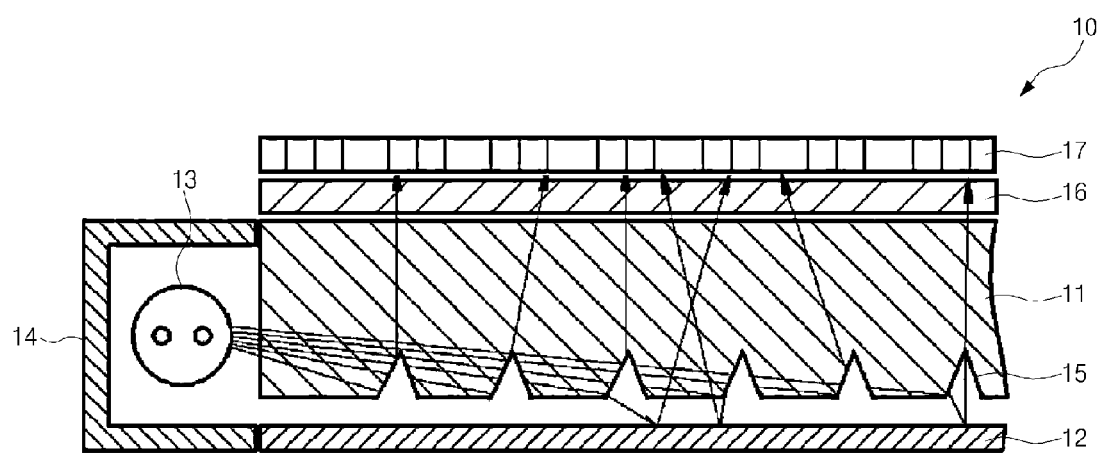
FIG. 1 is a diagram illustrating a conventional surface light source device.
Figure 2:
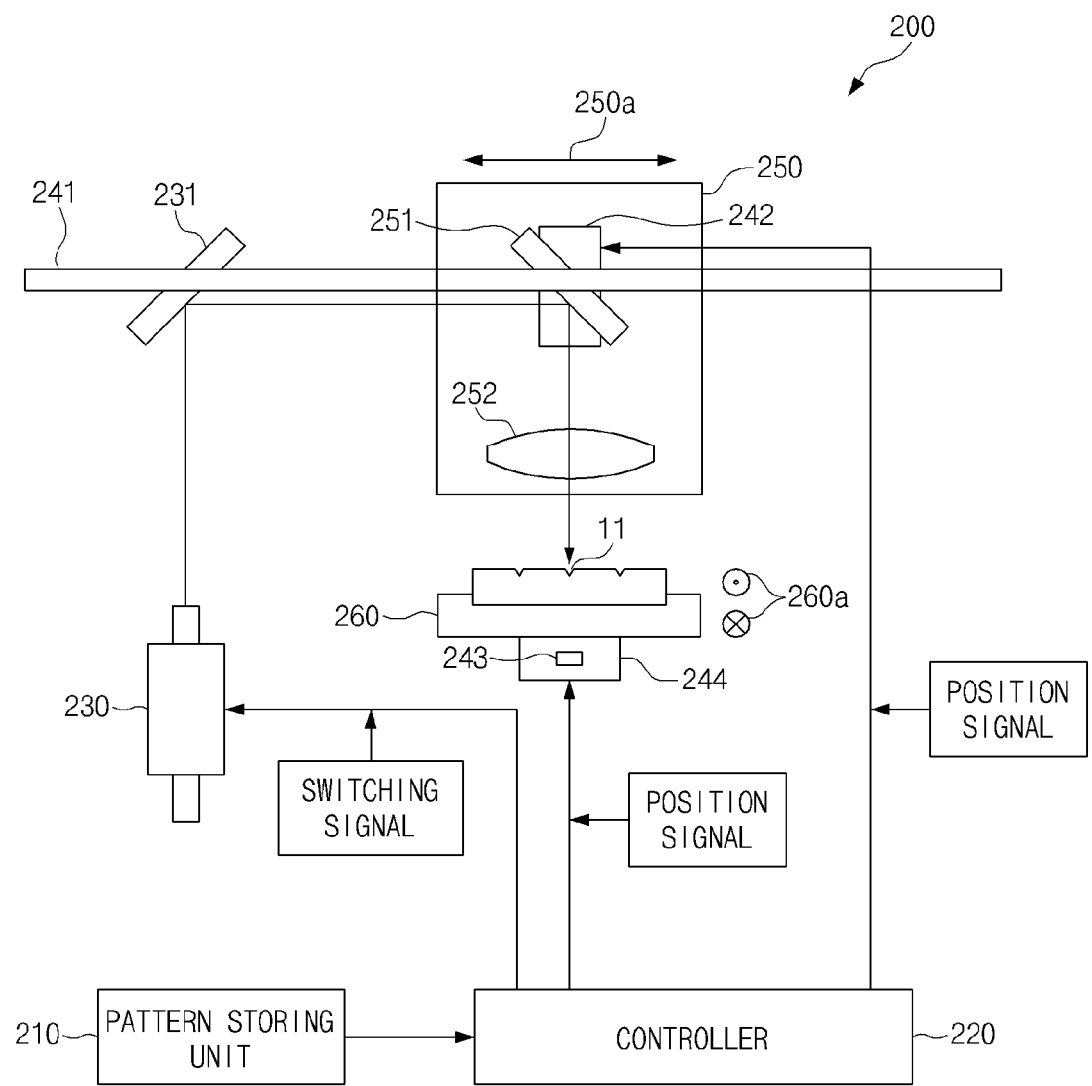
FIG. 2 is a diagram illustrating the whole construction of an apparatus for forming a pattern using a laser according to an exemplary embodiment of the present invention.

FIG. 2 is a diagram illustrating the whole construction of an apparatus for forming a pattern using a laser according to an exemplary embodiment of the present invention. The apparatus 200 includes a pattern storing unit 210, a controller 220, a laser oscillating unit 230, an X driver (i.e., a first driver) 242, a Y driver (i.e., a second driver) 244, a header unit 250, and a stage 260.

Referring to FIG. 2, the pattern storing unit 210 stores data on light guide patterns 11c of a discontinuous straight line shape to be formed in a light guide panel 11. In detail, the light guide patterns data can include position signal (i.e., X and Y coordinates) and length information on each light guide pattern 11c.

The controller 220 transmits a position signal of each light guide pattern 11c (specifically, a position signal including an X coordinate of each light guide pattern 11c read out from the pattern storing unit 210) to the first driver 242, and transmits a position signal including a Y coordinate of each light guide pattern 11c to the second driver 244. Also, the controller 220 generates a switching signal for oscillating the laser oscillating unit 230 on the basis of the length information of the light guide pattern 11c read out from the pattern storing unit 210, and transmits the generated switching signal to the laser oscillating unit 230.

The laser oscillating unit 230 outputs a laser beam synchronized with a movement of the header unit 250, on the basis of the switching signal received from the controller 220.

The X-Y drivers 242 and 244 can include the first driver 242 for moving the header unit 250 in horizontal direction 250a along a first guide rail 241, and the second driver 244 for moving the stage 260 in front and rear direction 260a along a second guide rail 243. The first and second drivers 242 and 244 can be realized by a linear motor, for example, but they are not necessarily limited to the linear motor.

The header unit 250 is integrally comprised of a second mirror 251 and a lens 252. The second mirror 251 vertically downwardly reflects a laser beam reflected by a first mirror 231. The lens 252 forms the light guide patterns 11c by concentrating the laser beam reflected by the second mirror 251, on a surface of the light guide panel 11.

The stage 260 moves along the fixed second guide rail 243 in the front and rear direction 260a of the light guide panel 11 by way of the second driver 244, and fixes the light guide panel 11.

A process of forming the light guide patterns using the above-constructed pattern forming apparatus 200 is described below in detail.

Referring to FIG. 2, the controller 220 reads out a position signal of the light guide pattern 11c to be formed in the light guide panel 11 (i.e., both a position signal including an X coordinate of each light guide pattern 11c and a position signal including a Y coordinate of each light guide pattern 11c) from the pattern storing unit 210, and transmits the read-out position signal to the first and second drivers 242 and 244, respectively. Also, the controller 220 generates a switching signal for oscillating the laser oscillating unit 230 on the basis of length information of the light guide pattern 11c read out from the pattern storing unit 210, and transmits the generated switching signal to the laser oscillating unit 230.

After that, on the basis of the switching signal received from the controller 220, the laser oscillating unit 230 outputs a laser beam synchronized with a movement of the header unit 250. Next, the output laser beam is reflected from the first mirror 231 coupled with the first guide rail 241 toward the header unit 250. After that, the laser beam is reflected and concentrated by the second mirror 251 and lens 252 of the header unit 250 to form the light guide pattern 11c in the surface of the light guide panel 11.

Figure 3:
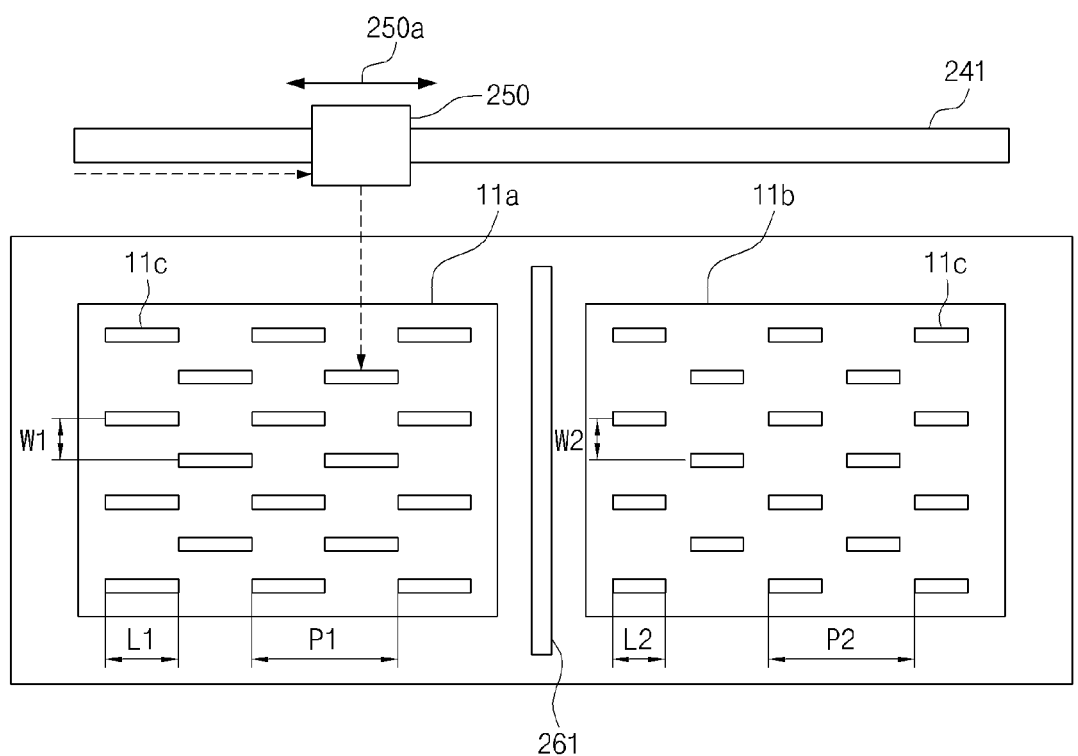
FIG. 3 is a diagram illustrating a dual stage capable of fixing two light guide panels according to an exemplary embodiment of the present invention.

FIG. 3 is a diagram illustrating a dual stage capable of fixing two light guide panels according to an exemplary embodiment of the present invention.

Referring to FIG. 3, the stage 260 can fix two light guide panels (e.g., a first light guide panel 11a and a second light guide panel 11b) at the left and right sides of a separating plate 261, respectively. According to an exemplary embodiment, the number of light guide panels fixed to the stage 260 may be a plural number of '3' or more in addition to '2' illustrated in FIG. 3.

On the other hand, in FIG. 3, light guide patterns 11c formed by reflecting and concentrating light in the header unit 250 are illustrated. The light guide patterns 11c are composed of a plurality of lines. In each line, the light guide patterns 11c of a discontinuous straight line shape are formed. In FIG. 3, reference numeral 'L1' denotes a length of each light guide pattern 11c formed in the first light guide panel 11a, 'P1' denotes a pitch between the light guide patterns 11c of the horizontal direction 250a, and 'W1' denotes an interval between the light guide patterns 11c of the front and rear direction 260a. Also, reference numeral 'L2' denotes a length of each light guide pattern 11c formed in the second light guide panel 11b, 'P2' denotes a pitch between the light guide patterns 11c of the horizontal direction 250a, and 'W2' denotes an interval between the light guide patterns 11c of the front and rear direction 260a.

The light guide pattern 11c varies its luminance characteristic according to length. In detail, in case that light sources are arranged at both sides, a light input part close to the light source has high luminance, while a center part far away from the light source has relatively low luminance. In this case, if a length of the light guide pattern 11c wholly decreases, the luminance of the light input part decreases, while the luminance of the center part relatively increases, thus being capable of making a luminance of the whole light guide panel uniform. Inversely, in case that the light input part close to the light source has low luminance and the center part far away from the light source has relatively high luminance, if the length of the light guide pattern 11c wholly increases, the luminance of the light input part increases, while the luminance of the center part relatively decreases, thus being capable of making the luminance of the whole light guide panel uniform. By using this characteristic, the present invention controls a luminance characteristic of the light guide panel.

In detail, as illustrated in FIGS. 2 and 3, the controller 220 differentially controls lengths (L1 and L2) of light guide patterns 11c of two light guide panels 11a and 11b such that the length (L2) of the light guide pattern 11c of the light guide panel 11b far away from the laser oscillating unit 230 is relatively shorter than the length (L1) of the light guide pattern 11c of the light guide panel 11a close to the laser oscillating unit 230. Thus, there is an effect of, even in case that a plurality of light guide panels are manufactured, being capable of wholly making luminance characteristics of all the light guide panels uniform through the differential control. In the present invention, the above description is made for forming the light guide patterns 11c in the two light guide panels 11a and 11b; however, the present invention is not necessarily limited to the two light guide panels but is also applicable to forming light guide patterns 11c in three or more light guide panels.

The controller 220 reads out position and length information on each light guide pattern 11c to be formed in the light guide panels 11a and 11b from the pattern storing unit 210 to form the light guide patterns 11c. At this time, there occurs an exterior warp phenomenon in which it is seen that the light guide patterns 11c formed in the light guide panels 11a and 11b are seemingly curved or warped along their edges due to several main causes. Accordingly, in order to eliminate this exterior warp phenomenon, the present invention intentionally adds a noise.

In detail, the controller 220 varies a starting point (X) of formation of the light guide pattern 11c. This is achieved by adding an arbitrary random value of about 5 μm to 100 μm to an X coordinate of a position signal read out from the pattern storing unit 210 and transmitting the X coordinate to the first driver 242, for each of the light guide patterns 11c to be formed in the light guide panels 11a and 11b. Or, the controller 220 varies a length of a light guide pattern 11c. This is achieved by generating a switching signal, which is an addition of an arbitrary random value of about 5 μm to 100 μm to length information (L1 and L2) of the light guide patterns 11c read from the pattern storing unit 210, and transmitting the switching signal to the laser oscillating unit 230, for each of the light guide patterns 11c to be formed in the light guide panels 11a and 11b. By adding an intentional noise as above, the present invention has an effect of eliminating the exterior warp phenomenon.

As described above, by differentially controlling lengths of light guide patterns and forming the light guide patterns in a plurality of light guide panels, the present invention can control a luminance characteristic of the light guide panel resulting from an output characteristic of a laser beam.

Also, by fixing a plurality of light guide panels to a stage to form light guide patterns, the present invention can improve the productivity of the light guide patterns.

Also, by adding an intentional noise in the way of varying, by a minute size, a starting point and length of each of light guide patterns to be formed, the present invention can eliminate an exterior warp phenomenon occurring in the light guide patterns.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for forming a pattern using a laser, the apparatus comprising:
    a pattern storing unit for storing data on light guide patterns of a discontinuous straight line shape to be formed in a light guide panel;
    a controller for reading out position signals of each of the light guide patterns to be formed in the light guide panel, from the pattern storing unit, transmitting the read-out position signals to an X-Y driver and simultaneously, and transmitting a switching signal, which is generated on the basis of length information of each of the light guide patterns, to a laser oscillating unit;
    the laser oscillating unit for outputting a laser beam synchronized with a movement of a header unit, on the basis of the switching signal received from the controller;
    the X-Y driver for moving the header unit and a stage, on the basis of the position signals received from the controller;
    the header unit for moving along a first guide rail in the left and right direction of the light guide panel by way of the X-Y driver, and forming the light guide patterns in the light guide panel by vertically downwardly reflecting and concentrating the laser beam output from the laser oscillating unit; and
    the stage for moving along a fixed second guide rail in the front and rear direction of the light guide panel by way of the X-Y driver, and fixing two or more light guide panels thereon,
    wherein, by differentially controlling length of each of the light guide patterns formed in each of the two or more light guide panels according to the data on light guide patterns and change of characteristics of the laser beams from the laser oscillating unit with difference of distances between the laser oscillating unit and the said each of the light guide patterns fixed to the stage, the controller is configured to make a luminance characteristic of the light guide panel as a surface light source device to be uniform across the said each of the two or more light guide panels under a luminance condition for the surface light source device given by the data on light guide patterns in the pattern storing unit.

2. The apparatus of claim 1, wherein the two or more light guide panels consist of a left light guide panel and a right light guide panel, wherein, by differentially controlling lengths of the light guide patterns formed in the left light guide panel and lengths of the light guide patterns formed in the right light guide panel, the controller controls the luminance characteristic of the light guide panel resulting from the distance-dependent output characteristic of the laser beam.

3. The apparatus of claim 1, wherein the controller varies a starting point of formation of the light guide pattern, by adding an arbitrary random value of 5 μm to 100 μm to an X coordinate of the position signal read out from the pattern storing unit, for each of the light guide patterns to be formed in the light guide panel.

4. The apparatus of claim 1, wherein the controller varies a length of the light guide pattern, by adding an arbitrary random value of 5 μm to 100 μm to the length information read out from the pattern storing unit, for each of the light guide patterns to be formed in the light guide panel.

5. The apparatus of claim 1, wherein the data on light guide patterns stored in the pattern storing unit are configured such that the length of the light guide pattern of a first light guide panel far away from the laser oscillating unit is relatively shorter than the length of the light guide pattern of a second light guide panel close to the laser oscillating unit, and wherein all the light guide patterns in one light guide panel have a same single length.

* * * * *